United States Patent [19]

Tsuyama

[11] Patent Number: 4,597,031
[45] Date of Patent: Jun. 24, 1986

[54] LIGHTING FIXTURE FOR BICYCLES AND THE LIKE VEHICLES

[75] Inventor: Sadaharu Tsuyama, Osaka, Japan

[73] Assignee: Tsuyama Mfg. Co., Ltd., Japan

[21] Appl. No.: 693,646

[22] Filed: Jan. 22, 1985

[30] Foreign Application Priority Data

Jan. 24, 1984 [JP] Japan .............................. 59-9068[U]

[51] Int. Cl.⁴ .......................... F21L 7/00; F21V 21/08
[52] U.S. Cl. ....................................... 362/72; 248/231; 362/191; 362/396
[58] Field of Search ...................... 362/72, 82, 83, 190, 362/191, 197, 198, 368, 396; 248/221.3, 231.1, 1, 316.2

[56] References Cited

U.S. PATENT DOCUMENTS

| | | | |
|---|---|---|---|
| 3,069,538 | 12/1962 | Hobsox | 248/231 |
| 3,559,941 | 2/1971 | Holzman | 248/231 |
| 4,510,557 | 4/1985 | Tsuyama | 362/72 |

FOREIGN PATENT DOCUMENTS

| | | | |
|---|---|---|---|
| 3337826 | 4/1984 | Fed. Rep. of Germany | 362/72 |
| 1258091 | 12/1971 | United Kingdom | 362/72 |

Primary Examiner—William A. Cuchlinski, Jr.
Attorney, Agent, or Firm—Allegretti, Newitt, Witcoff & McAndrews, Ltd.

[57] ABSTRACT

A lighting fixture including a body, an elastic member integrally attached to said body through a washer, the elastic member being engaged with a handlebar portion of, e.g. a bicycle, and a belt attached to one end of said washer. The belt is wound around the handlebar portion with the free end being fixedly inserted into a space defined at the other end of said washer, whereby the body is fixedly attached to said bicycle. The washer is detachably attached to the body by complementary engagement means provided on the bottom of said body and on the side of the washer facing the bottom so as to allow said washer to be selectively located in a plurality of directions with respect to said body. The complementary engagement means comprise projections or engagements on the body or the washer, respectively which engage within holes or recesses in the washer or the body, respectively. A guide protrusion is formed in the vicinity of the belt outlet side of said space so as to guide the free end of said belt in the extending direction, when said belt is fixedly inserted into said space.

5 Claims, 5 Drawing Figures

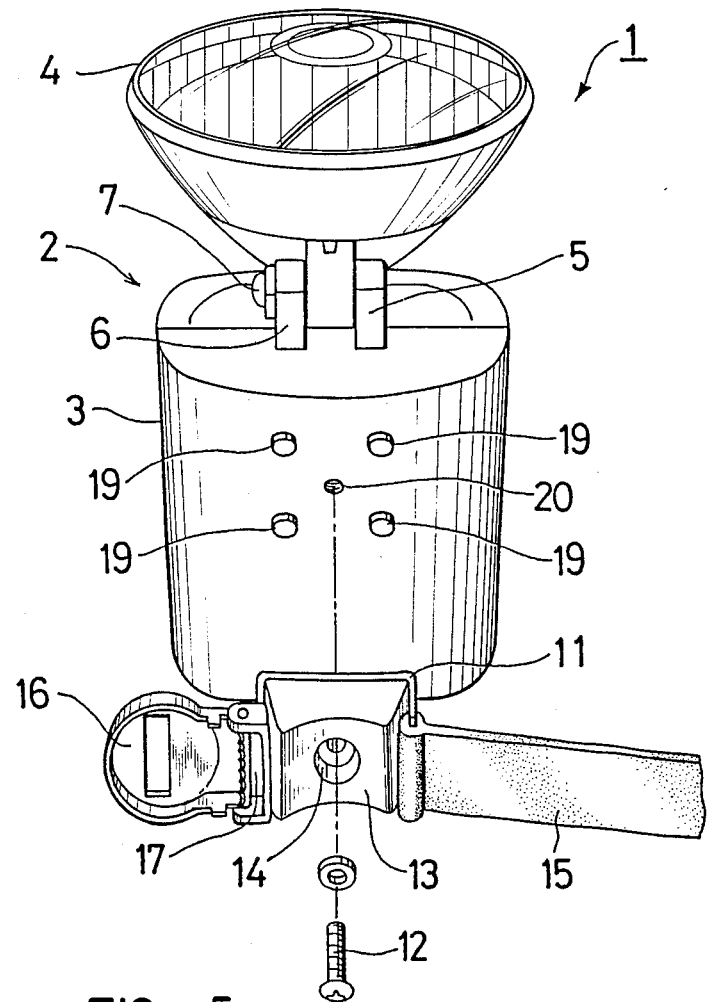
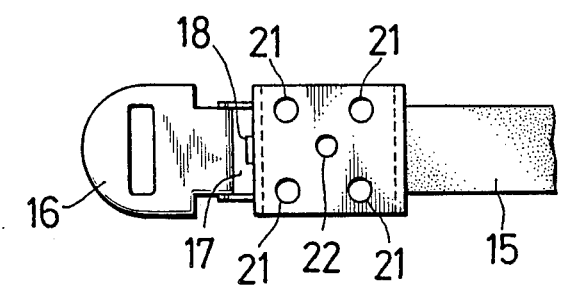

LIGHTING FIXTURE FOR BICYCLES AND THE LIKE VEHICLES

FIELD OF THE INVENTION

The present invention relates to a lighting fixture for bicycles, etc., and more specifically to improvements in the structure for attaching a lighting fixture body to a part of the frame of a bicycle, etc.

BACKGROUND OF THE INVENTION

In a prior art lighting fixture, an elastic member is integrally attached to the body thereof through a washer. While the elastic member is engaged with a handlebar portion of, e.g., a bicycle, a belt attached to one end of the washer is wound around said handlebar portion, and the free end of the belt is fixedly inserted into a space defined at the other end of the washer, whereby the lighting fixture body is attached to the bicycle.

According to the prior art, however, the winding direction of the belt is kept constant or fixed with respect to the lighting direction, with the result that only a limited position is permitted to hold the lighting fixture body in the desired lighting direction. The lighting fixture body cannot be angularly adjusted with respect to the washer to adjust the lighting direction relative to the winding direction.

SUMMARY OF THE INVENTION

A main object of the present invention is to provide a solution to the above-mentioned problem and, to this end, provides a lighting fixture which can selectively be located in a plurality of positions with respect to the lighting direction by complementary engagement means on the washer and lighting fixture and by detachably fixing the washer to the lighting fixture body.

Another object of this invention is the provision of a lighting fixture including a body, an elastic member integrally attached to said body through a washer, said elastic member being engaged with a handlebar portion of, e.g., a bicycle, and a belt attached to one end of said washer, which is wound around said handlebar portion, with the free end being fixedly inserted into a space defined at the other end of said washer, whereby said body is fixedly attached to said bicycle, wherein the washer is detachably attached to said body, and complementary engagement means are provided on the bottom of said body and on the side of said washer facing said bottom so as to allow said washer to be selectively located in a plurality of directions with respect to said body.

Yet another object of the present invention is the provision of a lighting fixture including a body, an elastic member integrally attached to said body through a washer, said elastic member being engaged with a handlebar portion of, e.g., a bicycle, and a belt attached to one end of said washer, which is wound around said handlebar portion, with the free end being fixedly inserted into a space defined at the other end of said washer, whereby said body is fixedly attached to said bicycle, wherein the washer is detachably attached to said body, complementary engagement means are provided on the bottom of said body and on the side of said washer facing said bottom so as to allow said washer to be selectively located in a plurality of directions with respect to said body, and a guide protrusion is formed in the vicinity of the belt outlet side of said space so as to guide the free end of said belt in the extending direction, when said belt is fixedly inserted into said space.

Other objects and advantages of the present invention will become more apparent hereinafter.

BRIEF DESCRIPTION OF THE DRAWINGS

The foregoing objects and features of the present invention will become apparent from the following detailed description with reference to the accompanying drawings, in which:

FIG. 1 is a perspective view showing one embodiment of the lighting fixture for bicycles according to the present invention;

FIG. 5 is a plan view of the washer used in the present invention.

DETAILED EXPLANATION OF THE PREFERRED EMBODIMENT OF THE INVENTION

Figure 2:
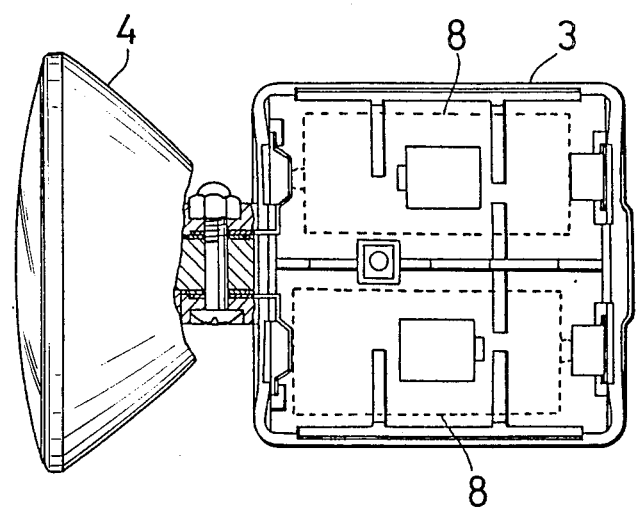
FIG. 2 is a partly sectioned plan view of the embodiment of FIG. 1 with the operable lid member being removed.
Figure 3:
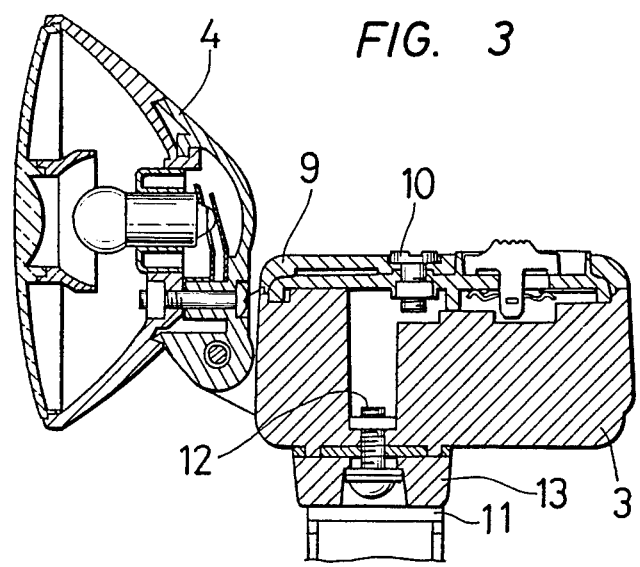
FIG. 3 is a longitudinally sectioned view of the embodiment of FIG. 1.

In FIGS. 1 to 5 inclusive, there are shown the overall structure and parts of the lighting fixture 1 for bicycles etc., according to the present invention. A lighting fixture body generally shown at 2 comprises a battery case 3 formed of synthetic resin into the form of a box and a lamp body 4 with a built-in bulb. The lamp body 4 is rotatably mounted between a pair of supporting arms 5 and 6 extending from the front face of the case 3 by means of a screw 7 for the adjustment of its lighting angle. On the other hand, the case 3 houses two source batteries 8 and 8 with the upper openable lid member 9 being bolted at 10.

A washer 11 is detachably fixed to the bottom of the case 3 in the vicinity of the lamp body 4 by means of a bolt 12. The bolt 12 comprises one form of fastening means for securing the washer 11 to the case 3. The washer 11 is substantially in the form of a C-shape, within which an elastic body 13 formed, for example, of rubber, is mounted as one piece. The elastic body 13 is recessed in the bottom in the direction parallel to both side walls of the washer 11. The elastic body 13 is also provided in the center of the bottom with a bore or hole 14 through which the bolt 12 passes. Furthermore, the side walls of the washer 11 are provided at their lower ends with a belt 15 and a belt-fixing fitting 16. Between the fitting 16 and the washer 11 there is left a space 17 for fixing the belt 15 in place. The belts 15 is then held in place by turning the fitting 16 toward the fixed end of belt 15.

A roof-like guide protrusion 18 extends from the center of the outer wall of the washer 11, and is located in the vicinity of the belt outer side of the space 17. The guide protrusion 18 is gently inclined at the side to which the belt 15 passes so as to lift up the free end of the belt 15 from the washer 11.

Four engagements or projections 19 in small columnar form are provided on the side of the case 3 to which the washer 11 is attached, with a bolt hole 20 being centrally located. The lines connecting these engagements 19 are parallel to the outer face of the case 3, and define a square. The engagements 19 are aligned with and are fitted into the associated holes or openings 21 formed in the upper face of the washer 11 to determine the directions of the belt 15 and the fitting 16. The engagements 19 and the holes 21 provide complementary engagement means for locating the case 3 relative to the washer 11 in selected direction depending upon the orientation of engagements 19 with respect to holes 21. Reference numeral 22 stands for a bolt hole for mounting the washer.

Reference will now be made to the manner for mounting the lighting fixture 1 for bicycle, etc. in place.

Figure 4:
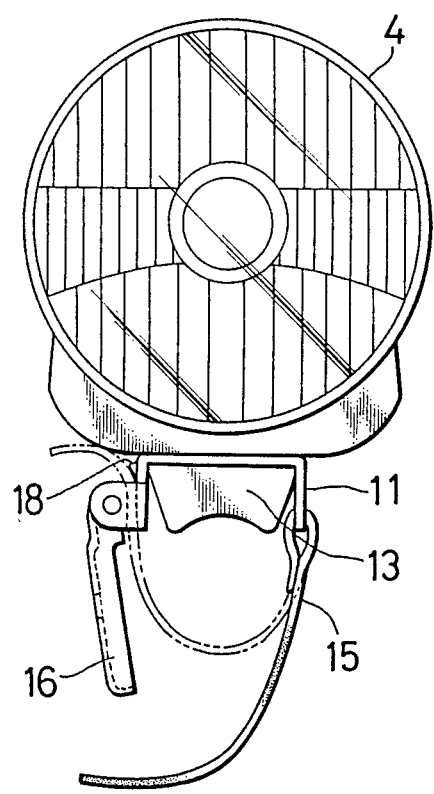
FIG. 4 is a front view of the embodiment of FIG. 1.

The washer 11 is fixed to the bottom of the battery case 3, while the concave portion of the elastic body 13 is directed to the direction parallel or normal to the lighting direction of the lamp body 4, and is located such that the belt 15 is inserted in a desired direction. Next, the concave portion of the elastic body 13 is engaged with a predetermined pipe portion of a bicycle, etc., for example, the handlebar or the frame, and the belt 15 is inserted at the free end into the space 17 in such a manner that it is wound around that pipe portion, as illustrated in FIG. 4. The free end of the belt 15 is lifted up by the guide protrusion 18, and disengages the side wall of the washer 11. Further insertion of the belt 15 causes its free end to be guided along the bottom of the battery case 3 in the peripheral direction thereof. Subsequently, the free end of the belt 15 is pulled to give sufficient tension thereto. Finally, the belt-fixing fitting 16 is turned toward the fixed end of the belt 15 to mount the lighting fixture 2 on the bicycle.

With the lighting fixture 1 constructed as mentioned above, it is possible to selectively locate the body thereof in a direction either parallel or perpendicular to the desired lighting direction. The body of the lighting fixture can also be firmly fixed to the washer so as to prevent the lighting direction from varying due to the vibration of the bicycle during cycling. Regardless of the position on which the body of the lighting fixture is mounted, the free end of the belt can be guided along an easily pullable direction, when that belt is fixedly inserted.

In an alternative embodiment of the present invention, the number of the engagements on the case and the associated holes in the washer may equally be five or more. According to this embodiment, the body of the lighting fixture may selectively be located at plural angles with respect to the lighting direction. In a further embodiment of the present invention, the same effect is obtained by using one engagement with respect to plural holes, and vice versa.

While I have shown a presently preferred embodiment of the present invention, it will be understood the invention may be embodied in other forms within the scope of the amended claims.

What is claimed is:

1. A lighting fixture including a body, an elastic member integrally attached to said body through a washer, said elastic member being engaged with a tubular portion of a bicycle or like vehicle, and a belt attached to one end of said washer, which is wound around said tubular portion with the free end being fixedly inserted into a space defined at the other end of said washer, whereby said body is fixedly attached to said bicycle, wherein: said washer is detachably attached to said body, complementary engagements are respectively provided on the bottom of said body and on the side of said washer facing said bottom so as to allow said washer to be selectively located in a plurality of directions with respect to said body, so as to permit the body to be mounted in a plurality of selected orientations on said tubular portion, said complementary engagements including a plurality of projections on one of said body or washer engaging within an associated opening in the other of said washer or body, and a guide protrusion is formed in the vicinity of the belt outlet side of said space so as to guide the free end of said belt in the extending direction, when said belt is fixedly inserted into said space.

2. A lighting fixture including a body, an elastic member integrally attached to said body through a washer, said elastic member being engaged with a tubular portion of a bicycle or like vehicle, and a belt attached to one end of said washer, which is wound around said tubular portion with the free end being fixedly inserted into a space defined at the other end of said washer, whereby said body is fixedly attached to said tubular portion, wherein: said washer is detachably attached to said body by fastening means, complementary engagement means are provided on the bottom of said body and on the side of said washer facing said bottom so as to allow said washer to be selectively located in a plurality of directions with respect to said body, said complementary engagement means comprising projections extending from one of said body or washer engaging within openings in the other of said washer or body.

3. A lighting fixture as in claim 2 wherein said complementary engagement means comprise projections extending from said body and engaging within openings in said washer.

4. A lighting fixture as in claim 3 wherein said complementary engagement means include a plurality of projections engaging within a like number of openings in said washer.

5. A lighting fixture as in claim 2, wherein the washer includes an elastic body having a concave portion adapted to engage said tubular portion.

* * * * *